UNITED STATES PATENT OFFICE.

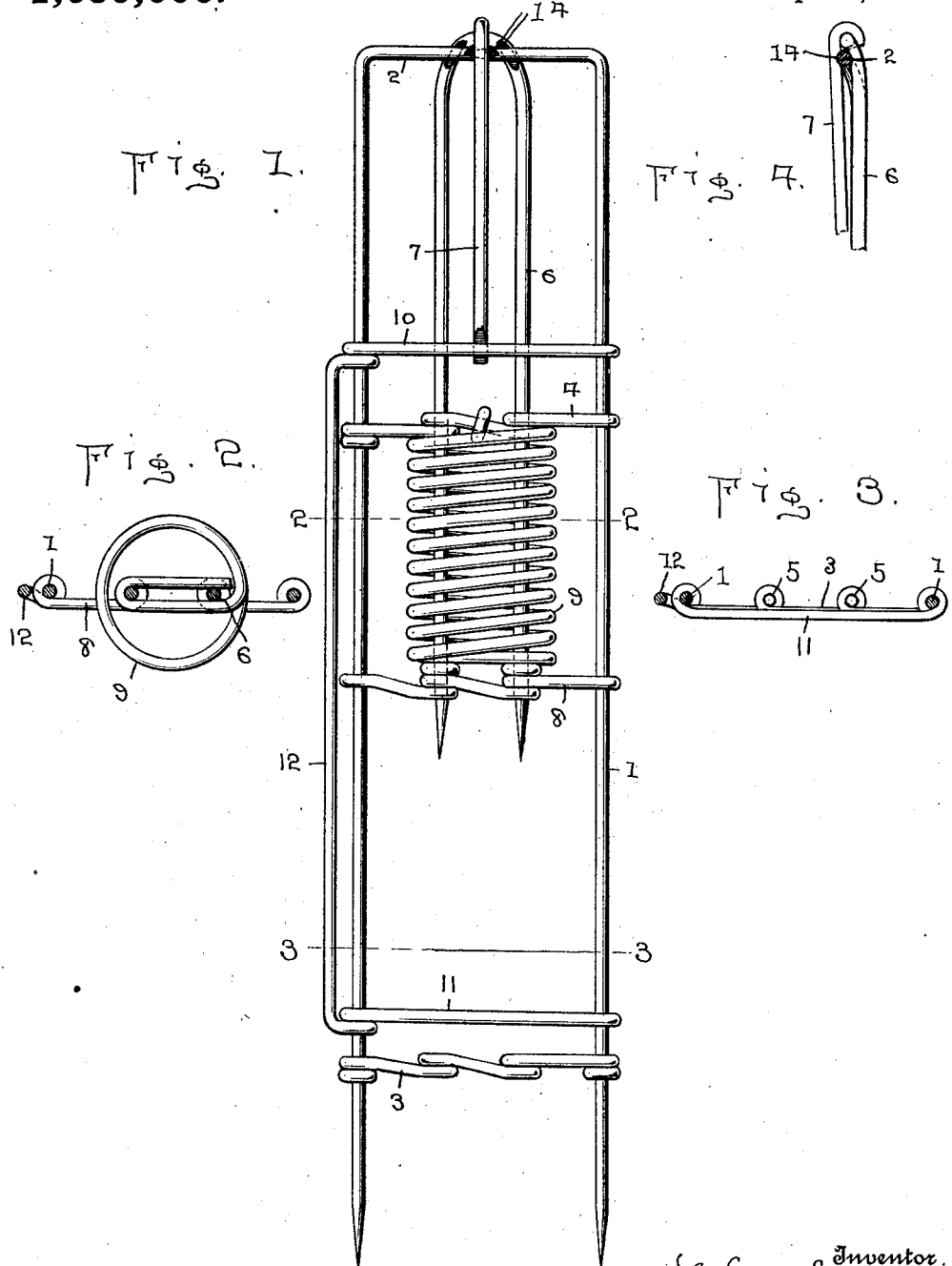

HENRY SCOTT, OF LEON, IOWA, ASSIGNOR OF ONE-HALF TO JOHN E. VAIL, OF GARDEN GROVE, IOWA.

ANIMAL-TRAP.

1,059,006.     Specification of Letters Patent.     Patented Apr. 15, 1913.

Application filed October 12, 1912. Serial No. 725,471.

*To all whom it may concern:*

Be it known that I, HENRY SCOTT, a citizen of the United States, residing at Leon, in the county of Decatur and State of Iowa, have invented certain new and useful Improvements in Animal-Traps; and I do hereby declare the following to be a full, clear, and exact description of the invention, such as will enable others skilled in the art to which it appertains to make and use the same.

This invention relates to traps for destroying animals of the burrowing class such as rats and ground squirrels, and other animals of similar nature, or other burrowing animals.

The object of the invention is to provide an efficient device which can be set in the ground in the path of the animal and which will be operated by the animal passing over a tread bar located on the floor or at opening or in pathway of its tunnel.

In the drawings, Figure 1 is a side elevation of my improved trap in set position. Fig. 2 is a sectional view on the line 2—2 of Fig. 1. Fig. 3 is a sectional view on the line 3—3 of Fig. 1, and, Fig. 4 is a vertical sectional view through the upper portion of Fig. 1.

Referring to the drawing, in which similar reference characters designate corresponding parts throughout the several views, 1 represents a substantially inverted U-shaped frame having the lower ends thereof pointed and the connecting portion 2 thereof disposed at an angle to the parallel sides. Adjacent the lower pointed ends of the parallel arms of the U-shaped frame 1, said arms are connected by a guide stay 3, said arms being again connected adjacent their upper ends by a similar guide stay 4. At two points between the parallel arms of the frame 1, each guide stay is looped to form openings 5, and slidably received within the upper guide stay 4 is an inverted U-shaped fork 6, having the lower ends thereof pointed and the upper portion thereof provided with a pivoted latch 7. Adjacent their lower ends, the parallel arms of the fork 6 are connected by a slide bar 8, the ends of said slide bar being extended laterally of the fork and slidably mounted over the parallel arms of the U-shaped frame 1, and adapted for movement longitudinally of the latter. Disposed about the fork 6 and between the slide bar 8 and the guide stay 4 is an actuating spring 9.

Slidably mounted between the parallel arms of the frame 1, adjacent the top and bottom ends thereof is a release bar 10 and a tread plate 11, respectively, said members 10 and 11 being slidably mounted on the frame and connected by the vertical bar 12. The portions of the members 2, 6 and 7 which contact, when the trap is set as in Fig. 1, are notched as at 14 so as to provide sufficient room between the latch 7 and the fork 6 for the end 2.

To set the trap, the fork 6 is moved upwardly within the frame 1 and the latch 7 is swung around the upper portion of the frame and engaged beneath the release bar 10 by moving the bar 12 upwardly upon the frame 1. In this position, the trap is set and the same may be placed in or above the ground in the path of the animal, in such position that the tread plate 11 is disposed on or adjacent the floor or any opening, or in path of the animal's tunnel. It is clearly apparent that when the animal passes through the tunnel or emerges from or enters the opening thereto, and steps or touches, or engages upon the tread plate 11, the same is depressed at the same time moving the release bar 10 and releasing the latch 7, when the fork 6 is allowed to move downwardly with the spring 9. The apertures 5 formed in the lower guide stay 3 being in alinement with the parallel arms of the fork 6, will receive the points of said fork when the trap is sprung, and thus positively prevent the animal from disengaging himself after being once impaled.

What I claim is:—

1. A trap comprising a U-shaped frame having pointed ends, a stay across the lower ends of said frame, a U-shaped impaling fork longitudinally movable in said frame, guides on the lower end of said fork, a guide rigidly secured to the frame for the upper end of said fork, a latch pivoted to the upper end of said fork adapted to be placed over the end of said frame, a release bar slidable on said frame and adapted to engage the free end of said latch, and a spring interposed between the guides on the lower end of said fork and on the upper end of said frame.

2. A trap comprising a U-shaped frame, the ends of said frame being pointed, an impaling fork longitudinally movable in said frame, a slide bar rigidly secured to the lower end of said fork and slidable on said frame, a stay rigidly secured to said frame and serving as a guide for said fork, a spring encircling said fork and interposed between said slide bar and stay, a latch pivoted to the end of said fork and adapted to be extended over the end of said frame, a release bar slidable longitudinally in said frame and adapted to be moved into the path of said latch, a tread plate slidable longitudinally in said frame, and a rigid connection between said release bar and tread plate.

In testimony whereof I have signed my name to this specification in the presence of two subscribing witnesses.

HENRY SCOTT.

Witnesses:
JOHN E. VAIL,
LOU H. PEASE.

Copies of this patent may be obtained for five cents each, by addressing the "Commissioner of Patents, Washington, D. C."